United States Patent
Renforth et al.

(10) Patent No.: US 9,814,215 B2
(45) Date of Patent: Nov. 14, 2017

(54) PET TOY WITH TELESCOPING WAND WITH METALLIC WIRE

(71) Applicant: DOSKOCIL MANUFACTURING COMPANY, INC., Arlington, TX (US)

(72) Inventors: Jack William Renforth, Azle, TX (US); Jackson Galaxy, Northridge, CA (US)

(73) Assignee: LITTLE BIG CAT, INC., Beverly Hills, CA (US)

( * ) Notice: Subject to any disclaimer, the term of this patent is extended or adjusted under 35 U.S.C. 154(b) by 52 days.

(21) Appl. No.: 14/641,794

(22) Filed: Mar. 9, 2015

(65) Prior Publication Data

US 2015/0257364 A1  Sep. 17, 2015

Related U.S. Application Data

(60) Provisional application No. 61/951,227, filed on Mar. 11, 2014.

(51) Int. Cl.
*A01K 29/00* (2006.01)
*A01K 15/02* (2006.01)
*B25G 1/04* (2006.01)

(52) U.S. Cl.
CPC ............ *A01K 15/025* (2013.01); *A01K 29/00* (2013.01); *B25G 1/04* (2013.01)

(58) Field of Classification Search
CPC ........................... A01K 15/025; A01K 15/026
USPC .......................................................... 119/708
See application file for complete search history.

(56) References Cited

U.S. PATENT DOCUMENTS

| | | | | |
|---|---|---|---|---|
| 2,307,905 | A * | 1/1943 | Ament | A01K 15/025 119/708 |
| 2,947,108 | A * | 8/1960 | Dodd, Jr. | A63H 27/04 446/30 |
| 3,731,925 | A * | 5/1973 | Caldwell | A63B 69/0088 473/424 |
| 4,712,510 | A * | 12/1987 | Tae-Ho | A01K 15/025 119/708 |
| 5,467,740 | A * | 11/1995 | Redwine | A01K 15/027 119/707 |
| 5,782,207 | A | 7/1998 | Goodham | |
| 6,314,913 | B1 * | 11/2001 | Lettau | A01K 15/025 119/702 |
| 8,181,606 | B1 | 5/2012 | Kirschbaum | |
| 2009/0205580 | A1 * | 8/2009 | Tiefel | A01K 15/025 119/708 |
| 2012/0012067 | A1 * | 1/2012 | Stout | A01K 15/025 119/707 |
| 2014/0000532 | A1 * | 1/2014 | Cogswell | A01K 15/025 119/708 |
| 2015/0257365 | A1 * | 9/2015 | Renforth | A01K 15/025 119/708 |

* cited by examiner

*Primary Examiner* — Kristen C Hayes
(74) *Attorney, Agent, or Firm* — Global IP Counselors, LLP

(57) ABSTRACT

A pet toy includes a handle, a wire composed of a metallic material, a wire attachment apparatus coupled with a first end of the wire, an attachment mechanism coupled to a second end of the wire and structured to releasably couple to an object, and a telescoping pole having a first end coupled to the handle and a second end coupled to the wire attachment apparatus.

17 Claims, 10 Drawing Sheets

PET TOY WITH TELESCOPING WAND WITH METALLIC WIRE

CROSS-REFERENCE TO RELATED APPLICATIONS

This patent application claims the priority benefit under 35 U.S.C. §119(e) of U.S. Provisional Application No. 61/951,227 filed on Mar. 11, 2014, and entitled, "TELESCOPING WAND WITH METALLIC WIRE AND GROUND TOY," the contents of which are hereby incorporated herein by reference.

BACKGROUND OF THE INVENTION

1. Field of the Invention

The disclosed concept relates generally to pet toys and, more particularly, to a pet toy including a wand with an attached object.

2. Description of the Related Art

It is generally well known in the relevant art to attach an object to the end of a wand using a string or chain to create a pet toy. These types of pet toys are particularly suitable as cat toys. Swinging the wand causes the object to move about as if it were flying or running which entice a cat to chase and catch the object. One example of such a cat toy is described in U.S. Pat. No. 6,318,300.

Although the types of pet toys using a wand with an object attached to it are suitable for entertaining pets, they are not without their drawbacks. For instance, the wand is generally an elongated piece that can be several feet long making it difficult or impractical to ship the pet toy. Also, when a string or chain is used in conjunction with a ground toy, the movement of the toy can be somewhat predictable. The string may also become tangled which can result in a considerable amount of time spent untangling the string. Furthermore, the object attached to the string tends to wear out before the wand, and it can be difficult or impossible to attach a new object to the string.

It would thus be desirable to provide an improved pet toy that overcomes these and other shortcomings in the relevant art.

SUMMARY OF THE INVENTION

These needs and others are met by embodiments of the disclosed concept in which a pet toy includes a telescoping wand and a metallic wire.

In accordance with aspects of the disclosed concept, a pet toy comprises: a handle; a wire composed of a metallic material; a wire attachment apparatus coupled with a first end of the wire; an attachment mechanism coupled to a second end of the wire and structured to releasably couple to an object; and a telescoping pole having a first end coupled to the handle and a second end coupled to the wire attachment apparatus.

In accordance with other aspects of the disclosed concept, a pet toy comprises: an object; a handle; a wire composed of a metallic material; a wire attachment apparatus coupled with a first end of the wire; an attachment mechanism coupled to a second end of the wire and structured to releasably couple to the object; and a telescoping pole having a first end coupled to the handle and a second end coupled to the wire attachment apparatus.

BRIEF DESCRIPTION OF THE DRAWINGS

A further understanding of the disclosed and claimed concept can be gained from the following Description when read in conjunction with the accompanying drawing in which:

Similar numerals refer to similar parts throughout the specification.

DETAILED DESCRIPTION OF EXEMPLARY EMBODIMENTS

Directional phrases used herein, such as, for example, left, right, front, back, top, bottom and derivatives thereof, relate to the orientation of the elements shown in the drawings and are not limiting upon the claims unless expressly recited therein.

Figure 1A:
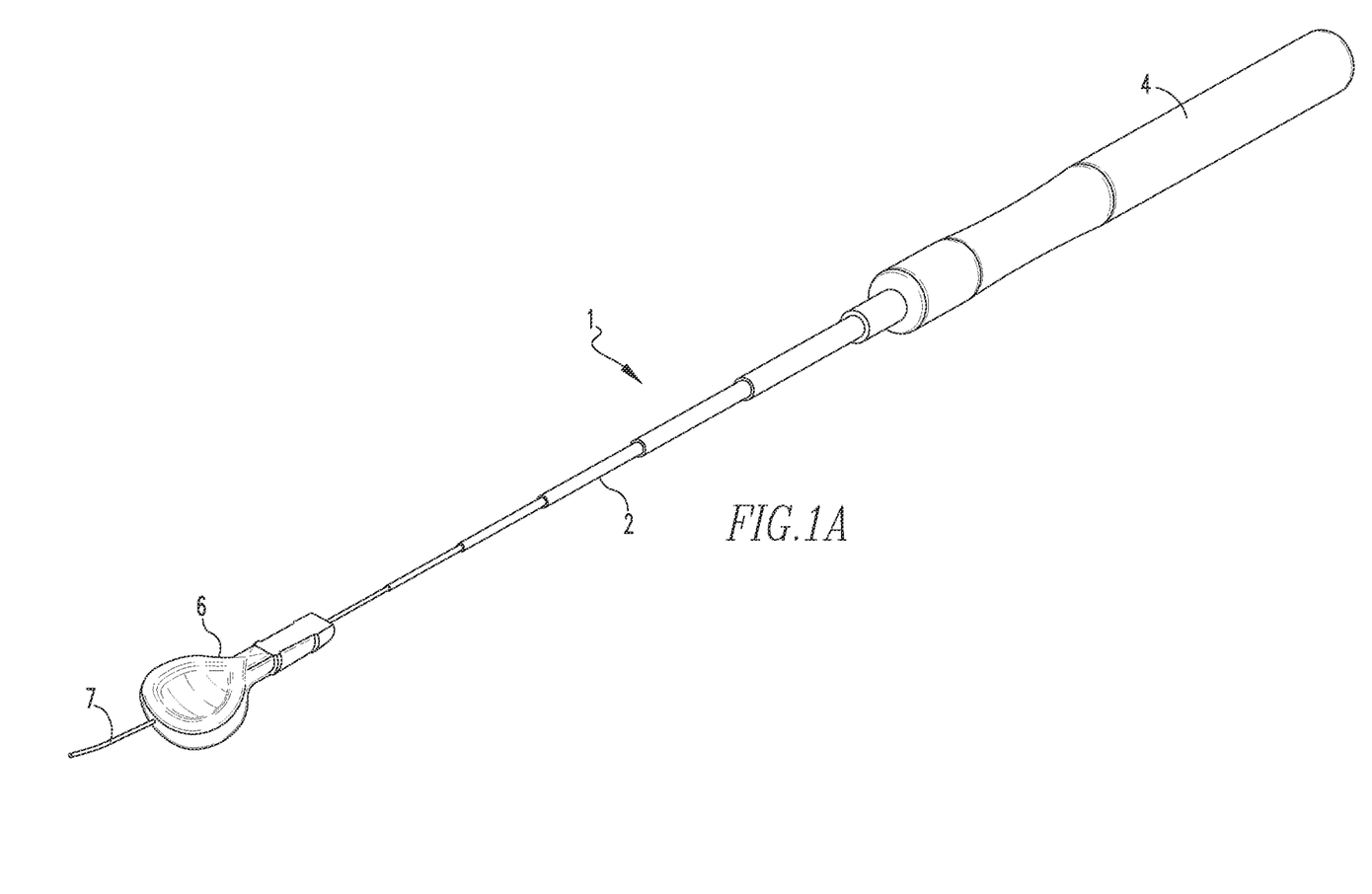
FIGS. 1A and 1B are isometric views of a telescoping wand with a metallic wire in accordance with an example embodiment of the disclosed concept.
Figure 1B:
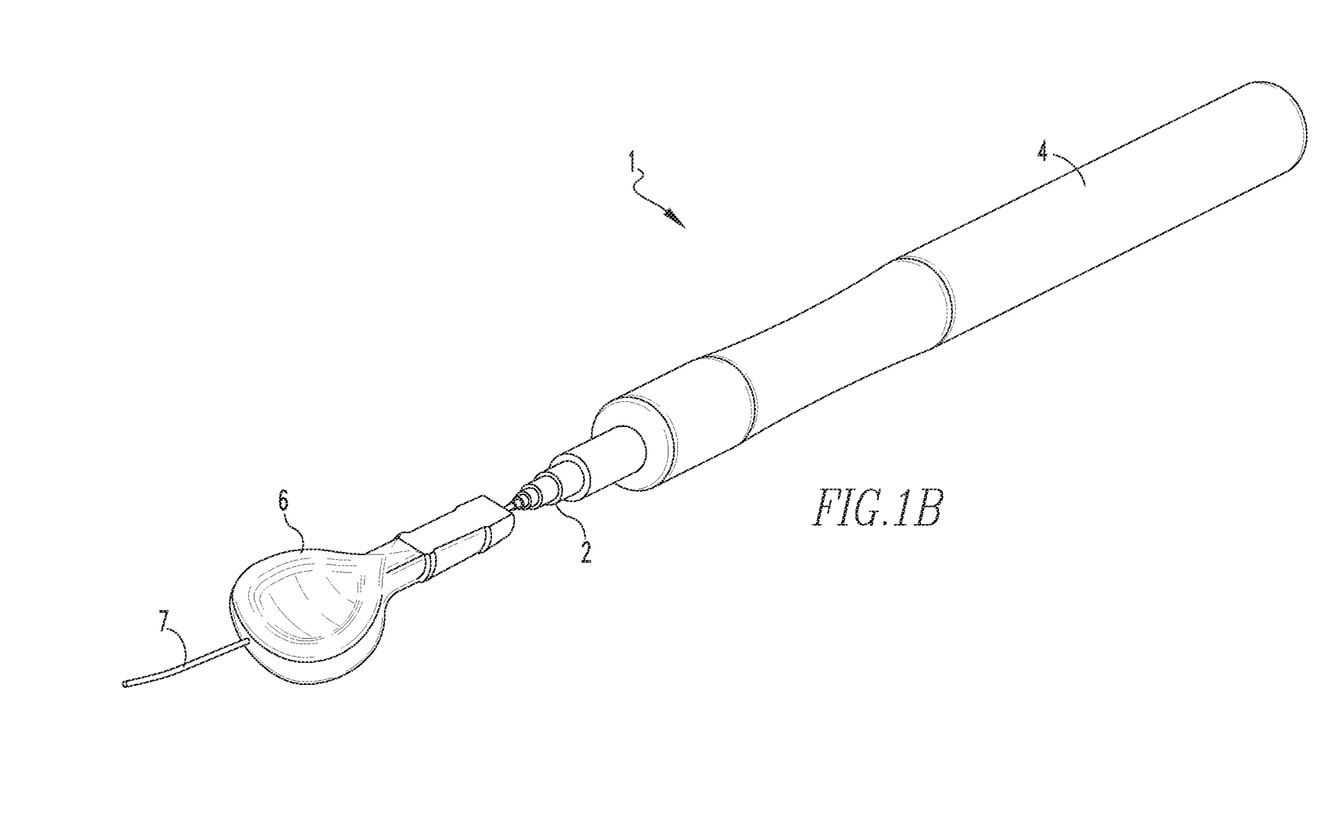

FIGS. 1A and 1B include isometric views of a pet toy 1 in an extended (FIG. 1A) and a retracted (FIG. 1B) position. The pet toy 1 includes a telescoping wand 2. A handle 4 is attached to one end of the telescoping wand 2 and a wire attachment apparatus 6 is attached to the other end of the telescoping wand 2. A metallic wire 7 extends from the wire attachment apparatus 6 and its distal end is attached to an object via an attachment mechanism, as will be described in more detail in the description related to FIG. 5. The telescoping wand 2 includes several segments that are able to retract into each other when the pet toy 1 is in the retracted position.

The telescoping wand 2 can be made from any suitable material. For example and without limitation, in some embodiments of the disclosed concept the telescoping wand 2 is made from a metallic material such as stainless steel. In other embodiments of the disclosed concept, the telescoping wand 2 is made from a plastic material.

As shown in FIG. 1B, when the telescoping wand is retracted, the size of the pet toy 1 is considerably reduced. When the telescoping wand 2 is retracted, the majority of it fits within the handle 4. This reduction in size makes it much easier to ship or travel with the pet toy 1.

Figure 2:
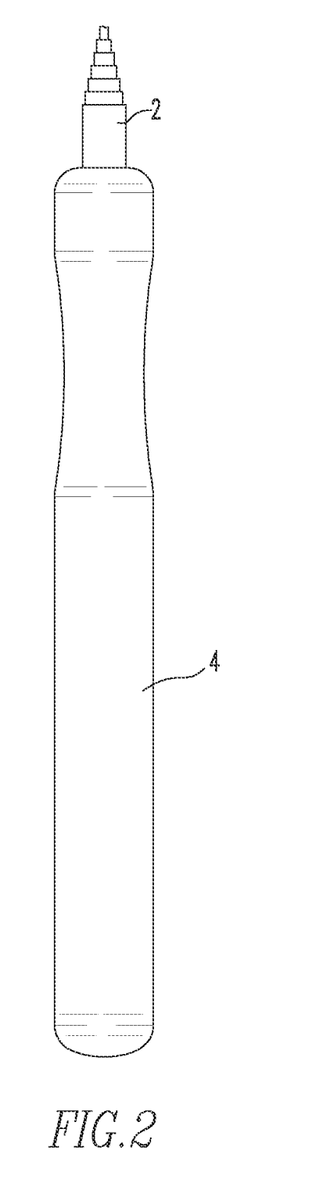
FIG. 2 is a view of a handle in accordance with an example embodiment of the disclosed concept.

FIG. 2 is a view of a handle 4 that is used in conjunction with the pet toy 1. The handle 4 is generally hollow so that the telescoping wand 2 can fit inside of it. The handle 4 can be made of any material, but it is preferable that the handle 4 is made of a material that is comfortable and easy to grip.

Figure 3A:
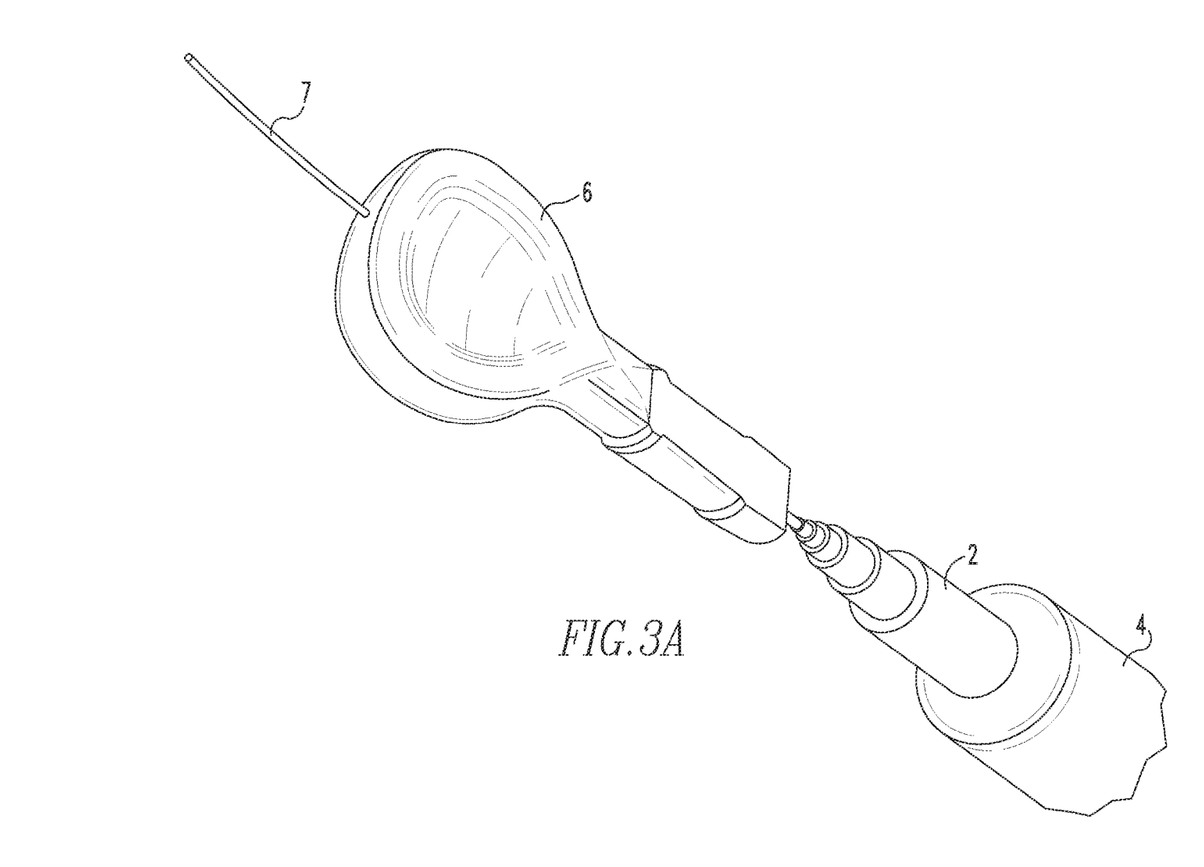
FIGS. 3A-3D are views of a wire attachment apparatus in accordance with an example embodiment of the disclosed concept.
Figure 3B:
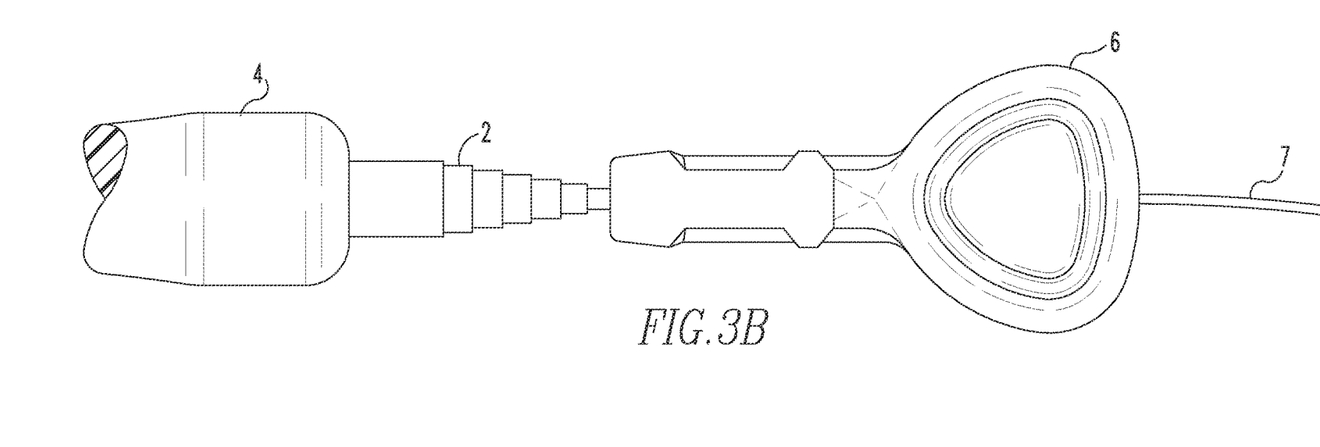
Figure 3C:
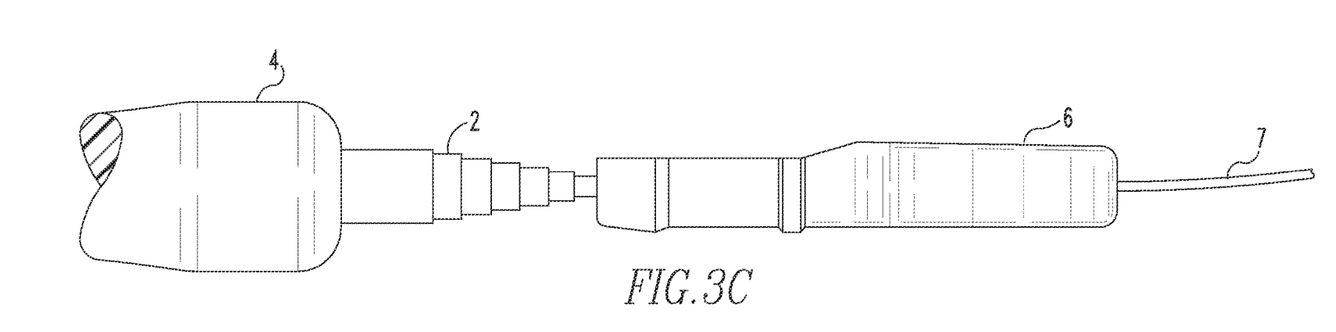
Figure 3D:
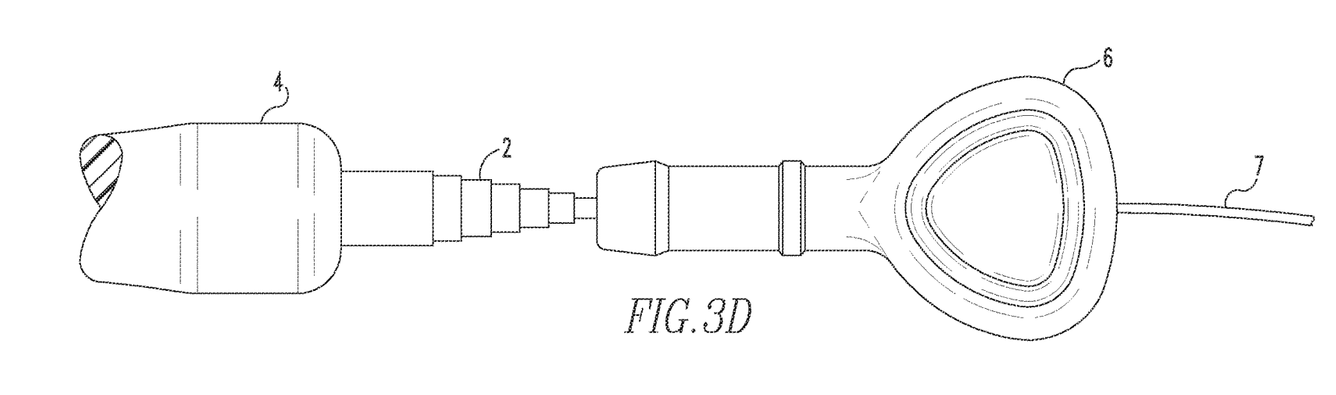

FIGS. 3A-3D are views of the wire attachment apparatus 6. FIG. 3A is an isometric view of the wire attachment apparatus 6, FIG. 3B is a front view of the wire attachment apparatus 6, FIG. 3C is a side view of the wire attachment apparatus 6, and FIG. 3D is a rear view of the wire attachment apparatus 6. As shown in FIGS. 3A-3D, the wire attachment apparatus 6 is attached to the end of the telescoping wand 2. One end of the metallic wire 7 is attached to the wire attachment apparatus 6. The metallic wire 7 extends from the wire attachment apparatus 6. It is contemplated that the wire attachment apparatus 6 may be made of any suitable material such as, without limitation, a plastic material.

The metallic wire 7 is made of a metallic material. In some exemplary embodiments of the disclosed concept, the metallic wire 7 is made of stainless steel. The metallic material provides the metallic wire 7 with a degree of rigidity and elasticity, unlike a string or a cord. Thus, unlike a string or a cord, when an object attached to the metallic wire 7 is batted, the object will move in an unpredictable fashion as the rigidity and elasticity of the metallic wire 7 in response to the weight of the object and the force it is batted with.

In some exemplary embodiments of the disclosed concept, the metallic wire 7 has a length within a range of about 25 to 35 inches and a thickness within a range of about 0.015 to 0.030 inches. These lengths and thicknesses of the metallic wire 7 result in an object attached to the metallic wire 7 to exhibit particularly unpredictable movement when batted. In another exemplary embodiment of the disclosed concept, the metallic wire 7 has a length of about 31.5 inches and a thickness of about 0.022 inches. In this exemplary embodiment of the disclosed concept, an object attached to the end of the metallic wire 7 also exhibits particularly unpredictable movement when batted.

In some exemplary embodiments of the disclosed concept, a metallic wire used in the Catfisher® Whipper Snapper™ Wand is employed as the metallic wire 7.

Figure 4:
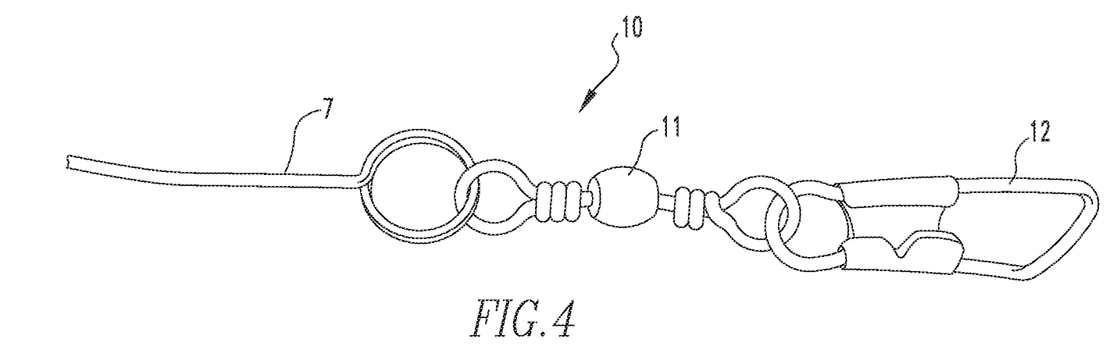
FIG. 4 is a view of an attachment mechanism in accordance with an example embodiment of the disclosed concept.

Referring to FIG. 4, an attachment mechanism 10 is shown. The attachment mechanism 10 is structured to releasably attach the metallic wire 7 to an object such as a ground squirrel toy. The attachment mechanism 10 shown in FIG. 4 has two primary parts, a swivel attachment 11 and a releasable hook 12. The swivel attachment 11 is coupled to the metallic wire 7 on one end and the releasable hook 12 on the other end. The swivel mechanism 11 is structured to be capable of swiveling. That is, when the object attached to the releasable hook 12 spins, the swivel mechanism 11 will swivel so that the metallic wire 7 does not also spin.

Figure 5:
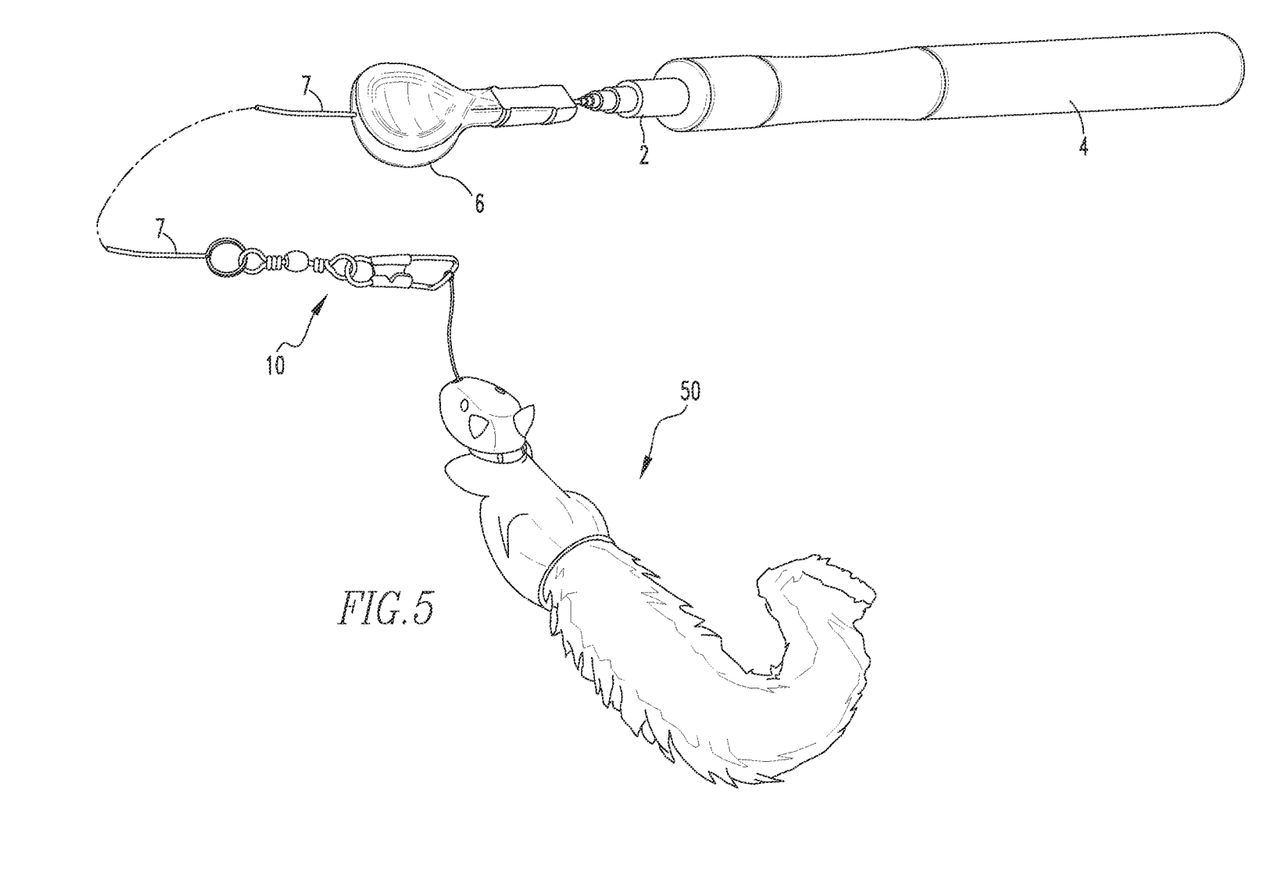
FIG. 5 is an isometric view of an assembled pet toy in accordance with an example embodiment of the disclosed concept.

Referring to FIG. 5, the pet toy 1 including a squirrel ground toy 50 is shown. As shown in FIG. 5, one end of the swivel mechanism 11 is coupled to the releasable hook 12. The other end of the releaseable hook 12 is releasably attached to the squirrel ground toy 50 via an attachment point 15 included on the squirrel ground toy 50. The attachment point 15 may be a loop, as shown in FIG. 5, or any other structure suitable to attach to. In some embodiments of the disclosed concept, a cord extends a short distance from the object and the attachment point is disposed at the end of the cord.

The releaseable hook 12 can be easily operated to detach the ground squirrel toy 50 from the releaseable hook 12. The squirrel ground toy 50 can then be easily reattached or another object can be easily attached to the releaseable hook 12. Thus, the attachment mechanism 10 makes it easy to detach an attached object when it becomes worn out and to attach a new object without discarding the other components of the pet toy 1 such as the telescoping wand 2 and wire attachment apparatus 6.

FIGS. 6-9 are examples of objects that can be attached to the distal end of the metallic wire 7 and used in conjunction with the telescoping wand 2 and the wire attachment apparatus 6. For example, referring to FIG. 6, a spider ground toy 20 is an example of an object that can be attached to the metallic wire 7.

Figure 6:
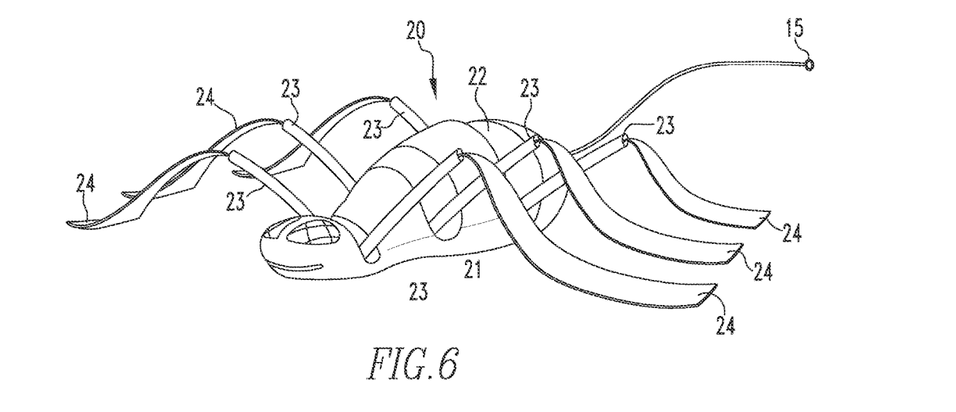
FIGS. 6-9 are views of ground toys in accordance with example embodiments of the disclosed concept.

The spider ground toy 20 includes a body 21. The body 21 is preferably made of a soft rubber material. The body 21 includes openings in which fur inserts 22 are placed. The spider ground toy 20 also three sets of legs. Each set of legs includes a pair of leg supports 23 that are made of a rigid material such as plastic. The leg supports 23 fit into the openings in the body 21. The sets of legs also include ribbon feet 24 that extend from each of the leg supports 23.

Figure 7:
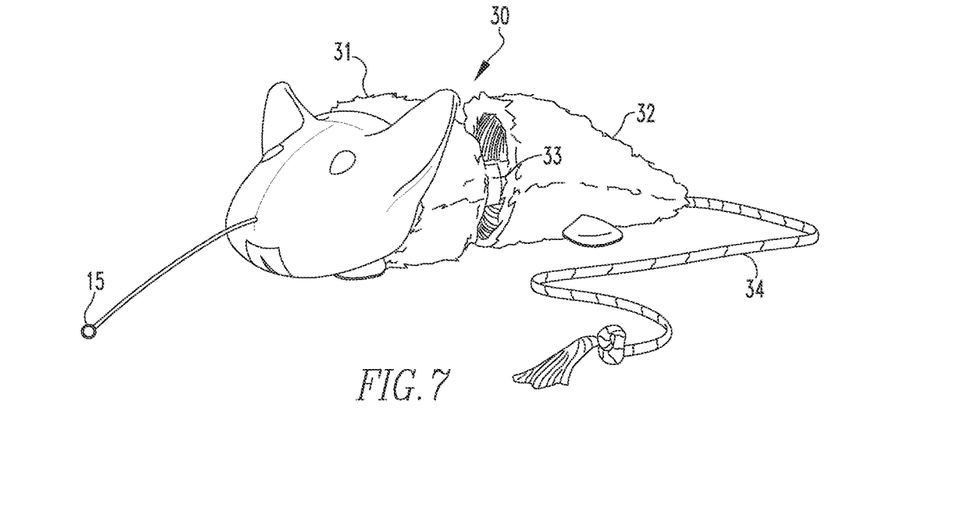

Referring to FIG. 7, a mouse ground toy 30 is shown. The mouse ground toy 30 includes a head section 31. The head section 31 is preferably made of a rigid material such as plastic or a soft rubber material. The head section 31 may also be partially fur covered. The mouse ground toy 30 also includes a body section 32. The body section 32 is preferably fur covered. The head section 31 and the body section 32 are connected together by a pivot mechanism 33. The pivot mechanism 33 is structured to allow the head section 31 and the body section 32 to pivot from side to side. The mouse ground toy 30 further includes a tail 34. The tail 34 is preferably made of string and includes a knotted end.

Figure 8:
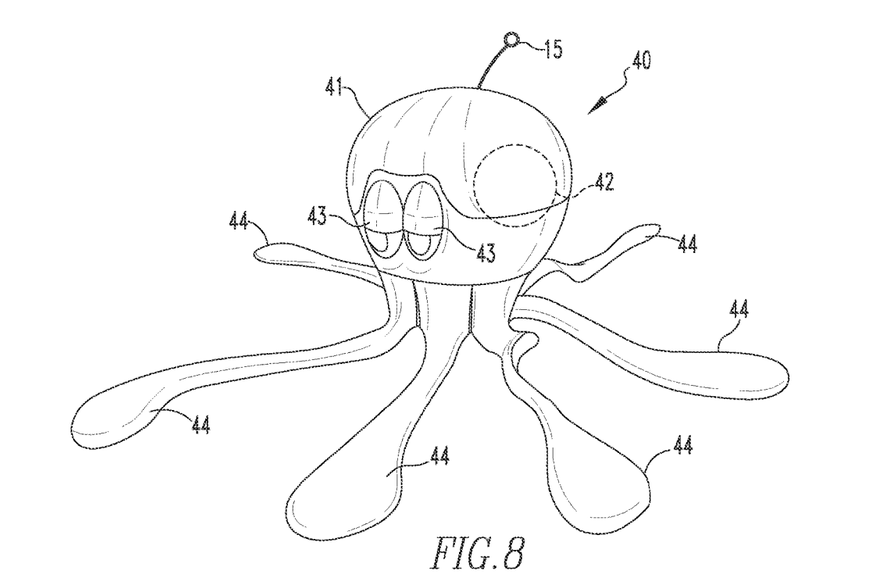

Referring to FIG. 8, an octopus ground toy 40 is shown. The octopus ground toy 40 includes a head section 41. The head section 41 is preferably made of a rigid material such as plastic. The head section 41 is at least partially hollow and at least partially transparent so that the inside of the head section 41 can be seen. A ball 42 is disposed inside the hollow area of the head section 41. The head section 41 further includes a pair of eyes 43. The eyes 43 are moveable such as, for example and without limitation, opening and closing eyelids or moving pupils. The octopus ground toy 40 further includes a number of legs 44 attached to the head section 41. The exterior of the legs 44 is preferably made of a soft material such as fabric. The inside of the legs 44 may include a noisemaking material such as crinkle plastic.

Figure 9:
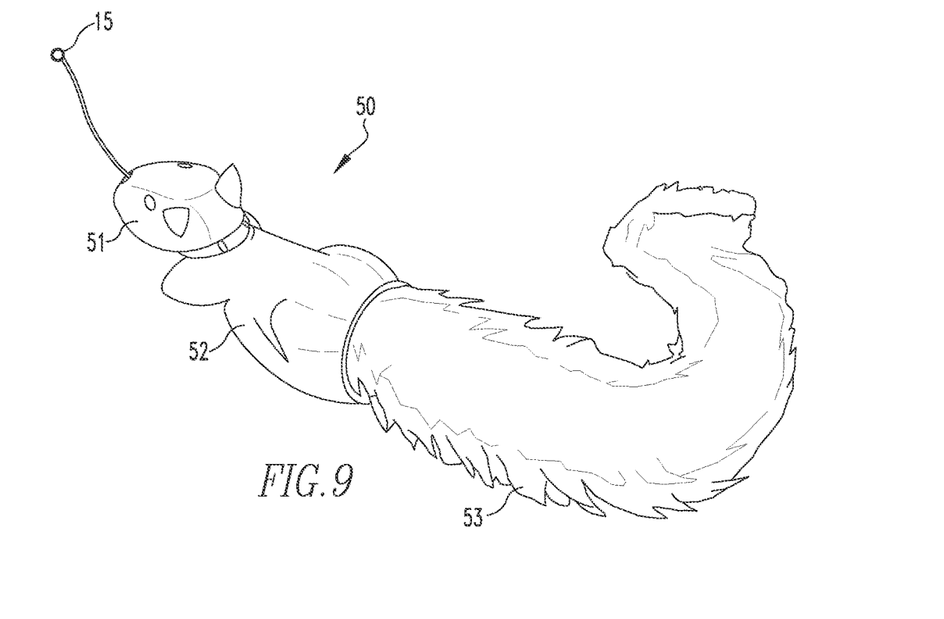

Referring to FIG. 9, the squirrel ground toy 50 is shown. The squirrel ground toy 50 includes a head 51 and a body 52. The head 51 and the body 52 are connected to each other. The head 51 and the body 52 are preferably made of a soft rubber material. The squirrel ground toy 50 further includes a tail section 53. The tail section 53 is preferably made to look furry like a squirrel's tail. The tail section 53 may be made to look furry by covering in with a soft material such as fabric. The tail section 53 may be attached to the body 52 or a string may be used to pull the tail section 53 into the body 52. The squirrel ground toy 50 further includes an interior tail section. The interior tail section fits inside the tail section 53. The interior tail section is preferably made of a noisemaking material such as crinkle plastic.

While some example of objects that can be attached to the metallic wire 7 have been described with respect to FIGS. 6-9, it will be appreciated that any suitable object may be attached to the metallic wire 7 without departing from the scope of the disclosed concept. The spider ground toy 20, the mouse ground toy 30, the octopus ground toy 40, and the squirrel ground toy 50 are all ground toys which are particularly suitable for use with the telescoping wand 2 and the metallic wire 7. The metallic wire 7 causes the attached object to slide and bounce in an unpredictable manner as through it were an animal scurrying along the ground.

Although the foregoing discussion has presented specific embodiments, persons skilled in the art will recognize that changes may be made in form and detail without departing from the spirit and scope of the embodiments to achieve similar functionality and utility to the exemplary embodiments disclosed herein. Moreover, it should be appreciated that features from a particular embodiment may be implemented in another embodiment disclosed herein to achieve a desired functionality. Accordingly, the specific embodiments described herein should be understood as examples and not limiting the scope of the disclosure.

What is claimed is:

1. A pet toy, comprising:
   a handle;
   a wire composed of a metallic material, and having a predetermined degree of rigidity and elasticity that enables the wire to move unpredictably;
   a wire attachment apparatus coupled with a first end of the wire;
   an attachment mechanism coupled to a second end of the wire and structured to releasably couple to a mouse ground toy including a head section and a body section pivotally coupled to the head section, the body section being at least partially fur covered; and
   a telescoping pole having a first end coupled to the handle and a second end coupled to the wire attachment apparatus.

2. The pet toy of claim 1, wherein the telescopic pole includes a plurality of segments that are structured to retract into each other.

3. The pet toy of claim 1, wherein the telescopic pole is composed of a metallic material or a plastic material.

4. The pet toy of claim 1, wherein the handle includes a hollow interior portion structured to receive a telescopic wand.

5. The pet toy of claim 1, wherein the wire attachment apparatus is compose of a plastic material.

6. The pet toy of claim 1, wherein the wire has a length within a range of about 25 to about 35 inches.

7. The pet toy of claim 1, wherein the wire is composed of stainless steel.

8. The pet toy of claim 1, wherein the wire has a thickness in a range of about 0.015 to about 0.030 inches.

9. The pet toy of claim 1, wherein the wire is structured to move unpredictably when the mouse ground toy is batted.

10. The pet toy of claim 1, wherein the attachment mechanism includes a releasable hook structured to releasably couple to the mouse ground toy.

11. The pet toy of claim 10, wherein the attachment mechanism includes a swivel mechanism having a first end coupled with the wire and a second end coupled with the releasable hook, and wherein the swivel mechanism is structured to swivel when the releasable hook spins.

12. A pet toy, comprising:
    a mouse ground toy including a head section and a body section pivotally coupled to the head section, the body section being at least partially fur covered;
    a handle;
    a wire composed of a metallic material, and having a predetermined degree of rigidity and elasticity that enables the wire to move unpredictably;
    a wire attachment apparatus coupled with a first end of the wire;
    an attachment mechanism coupled to a second end of the wire and structured to releasably couple to the mouse ground toy; and
    a telescoping pole having a first end coupled to the handle and a second end coupled to the wire attachment apparatus.

13. The pet toy of claim 12, wherein the mouse ground toy further includes a tail coupled to the body section,
    wherein the tail includes a string having a knotted end.

14. A pet toy comprising:
    a spider ground toy including a body, sets of legs extending from the body, the sets of legs each including a pair of leg supports composed of a rigid material and a pair of ribbon feet;
    a handle;
    a wire composed of a metallic material, and having a predetermined degree of rigidity and elasticity that enables the wire to move unpredictably;
    a wire attachment apparatus coupled with a first end of the wire;
    an attachment mechanism coupled to a second end of the wire and structured to releasably couple to the spider around toy; and
    a telescoping pole having a first end coupled to the handle and a second end coupled to the wire attachment apparatus.

15. A pet toy comprising:
    an octopus ground toy including
      a head section composed of a rigid material, and
      a plurality of legs attached to the head section, each of the legs being covered in a soft material;
    a handle;
    a wire composed of a metallic material, and having a predetermined degree of rigidity and elasticity that enables the wire to move unpredictably;
    a wire attachment apparatus coupled with a first end of the wire;
    an attachment mechanism coupled to a second end of the wire and structured to releasably couple to the octopus ground toy; and
    a telescoping pole having a first end coupled to the handle and a second end coupled to the wire attachment apparatus.

16. The pet toy of claim 15, wherein the head section includes a hollow area, and wherein a ball is disposed in the hollow area.

17. A pet toy comprising:
    a squirrel ground toy including
      a head section,
      a body section coupled to the head section, and
      a tail section coupled to the body section, the head and body sections being composed of a rubber material, the tail section being covered with a fabric material
    a handle;
    a wire composed of a metallic material, and having a redetermined degree of rigidity and elasticity that enables the wire to move unpredictably;
    a wire attachment apparatus coupled with a first end of the wire;
    an attachment mechanism coupled to a second end of the wire and structured to releasably couple to the squirrel ground toy; and
    a telescoping pole having a first end coupled to the handle and a second end coupled to the wire attachment apparatus.

* * * * *